(12) United States Patent
Matsumoto et al.

(10) Patent No.: US 11,461,612 B2
(45) Date of Patent: Oct. 4, 2022

(54) RFID TAG AND RFID TAG-EQUIPPED ARTICLE

(71) Applicant: Murata Manufacturing Co., Ltd., Nagaokakyo (JP)

(72) Inventors: Kengo Matsumoto, Nagaokakyo (JP); Shogo Tokoi, Nagaokakyo (JP); Hiroshi Nonogaki, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 62 days.

(21) Appl. No.: 17/090,645

(22) Filed: Nov. 5, 2020

(65) Prior Publication Data

US 2021/0056373 A1    Feb. 25, 2021

Related U.S. Application Data

(63) Continuation of application No. PCT/JP2020/016246, filed on Apr. 13, 2020.

(30) Foreign Application Priority Data

Jun. 21, 2019    (JP) .............................. JP2019-115686

(51) Int. Cl.
*G06K 19/077*    (2006.01)
*H01Q 1/22*    (2006.01)
*H01Q 7/00*    (2006.01)

(52) U.S. Cl.
CPC ... *G06K 19/07779* (2013.01); *G06K 19/0772* (2013.01); *H01Q 1/2225* (2013.01); *H01Q 7/00* (2013.01)

(58) Field of Classification Search
CPC ......... G06K 19/07779; G06K 19/0772; H01Q 1/2225; H01Q 7/00; H04B 5/0062; H04B 5/0081; A61B 90/98

(Continued)

(56) References Cited

U.S. PATENT DOCUMENTS

| 2004/0052034 A1 | 3/2004 | Senba et al. |
| 2016/0020517 A1* | 1/2016 | Florek .................. H04B 5/0025 343/788 |
| 2020/0160136 A1* | 5/2020 | Huang ............. G06K 19/07737 |

FOREIGN PATENT DOCUMENTS

| JP | 2002157565 A | * | 5/2002 |
| JP | 2002157565 A |   | 5/2002 |

(Continued)

OTHER PUBLICATIONS

International Search Report issued for PCT/JP2020/016246, dated Jun. 30, 2020.

*Primary Examiner* — Brian Wilson
(74) *Attorney, Agent, or Firm* — ArentFox Schiff LLP

(57) ABSTRACT

An RFID tag that includes an RFID tag body having a conductor in a loop-like shape or a coil-like shape, and metal fixtures for fixing the RFID tag body to a metal surface of an article. The conductor is formed in an element body in a rectangular parallelepiped shape that has first and second side surfaces facing each other, third and fourth side surfaces facing each other and orthogonal to the first side surface, a top surface, and a bottom surface serving as a mounting surface. A plane of an opening of the conductor is parallel to the first side surface and the second side surface, and the metal fixtures each include a first portion protruding along an extension surface of the bottom surface, a second portion disposed along the third side surface or the fourth side surface, and a third portion disposed along the top surface.

19 Claims, 15 Drawing Sheets

(58) Field of Classification Search
USPC .......................................... 340/572.7–572.9
See application file for complete search history.

(56) References Cited

FOREIGN PATENT DOCUMENTS

| | | | |
|---|---|---|---|
| JP | 2002157568 | A | 5/2002 |
| JP | 4796180 | B2 | 10/2011 |
| JP | 2011204130 | A | 10/2011 |

* cited by examiner

COMPARATIVE EXAMPLE

RFID TAG AND RFID TAG-EQUIPPED ARTICLE

CROSS REFERENCE TO RELATED APPLICATIONS

The present application is a continuation of PCT/JP2020/016246 filed Apr. 13, 2020, which claims priority to Japanese Patent Application No. 2019-115686, filed Jun. 21, 2019, the entire contents of each of which are incorporated herein by reference.

TECHNICAL FIELD

The present invention relates to an RFID tag attached to a metal article for use, and an RFID tag-equipped article including the metal article and the RFID tag.

BACKGROUND

Patent Document 1 (identified below) discloses a tag attached to a metal member. This RFID tag includes an RFID tag body including an IC chip and a micro-loop antenna connected to the IC chip, an arm covering the IC chip with an insulating layer interposed therebetween, and a mounting surface for mounting the RFID tag body on a metal member, allowing a loop surface of the micro-loop antenna to be substantially perpendicular to a mounting metal surface.

Patent Document 1: Japanese Patent No. 4796180

The RFID tag described in Patent Document 1 includes the micro-loop antenna that is formed as a loop of at least one turn including the IC chip in an electromagnetic wave radiation direction, and the arm that is connected to the micro-loop antenna and that extends in a winding direction of the loop by at least a length corresponding to about a half turn of the loop to cover the IC chip. This configuration requires designing a length of a folded-back structure protection metal fitting on the premise of ¼ wavelength, which in turn makes it difficult to reduce the size of the device. The RFID tag described in Patent Document 1 is not configured such that a small tag is bonded to a metal surface and the metal surface is used as a radiator.

SUMMARY OF THE INVENTION

Thus, it is an object of the present invention to provide an RFID tag that is small in size and can be reliably attached to a metal surface of an article. It is also an object of the present invention to provide an RFID tag that can use a metal surface of an article as a radiator. It is further an object of the present invention to provide an RFID tag-equipped article to which a small RFID tag is attached.

In an exemplary aspect, the RFID tag disclosed herein includes an RFID tag body having a conductor in a loop-like shape or a coil-like shape, and a metal fixture for fixing the RFID tag body to a metal surface of an article.

The conductor in a loop-like shape or a coil-like shape is formed in an element body in a rectangular parallelepiped shape that has a first side surface and a second side surface facing each other, a third side surface and a fourth side surface facing each other orthogonal to the first side surface, a top surface, and a bottom surface serving as a mounting surface.

Moreover, a plane of an opening of the conductor in a loop-like shape or a coil-like shape is parallel to the first side surface and the second side surface.

The metal fixture includes a first portion protruding along an extension surface of the bottom surface, a second portion disposed along the third side surface or the fourth side surface, and a third portion disposed along the top surface.

An RFID tag-equipped article of the exemplary embodiment includes an RFID tag having a conductor in a loop-like shape, and an article having a metal surface to which the RFID tag is fixed, the RFID tag having the configuration described above.

The exemplary embodiment of the present invention provides an RFID tag that is small in size and can be reliably attached to a metal surface of an article, and an article provided with the RFID tag. Moreover, the exemplary embodiment of the present invention also provides an RFID tag that can use a metal surface of an article as a radiator, and an article provided with the RFID tag.

DETAILED DESCRIPTION OF EMBODIMENTS

Figure 1A:
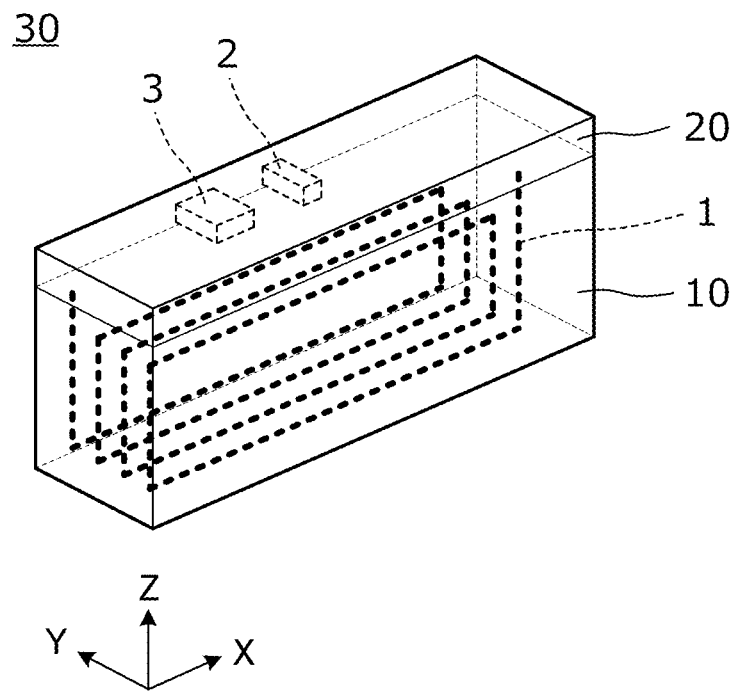
FIG. 1A is a perspective view of an RFID tag body 30 according to a first exemplary embodiment.

Hereinafter, a plurality of modes for carrying out the exemplary embodiments of the present invention will be shown with some specific examples with reference to the drawings. Each drawing shows the same portions designated by the same reference numerals. Although exemplary embodiments are shown separately in consideration of convenience in easiness of description or understanding of a main point, configurations shown in different embodiments can be partially replaced or combined. It is noted that in the second and subsequent exemplary embodiments, description of matters common to the first embodiment will be eliminated, and only different points will be described. In particular, similar effects obtained by similar configurations will not be sequentially described for each embodiment.

First Exemplary Embodiment

Figure 1B:
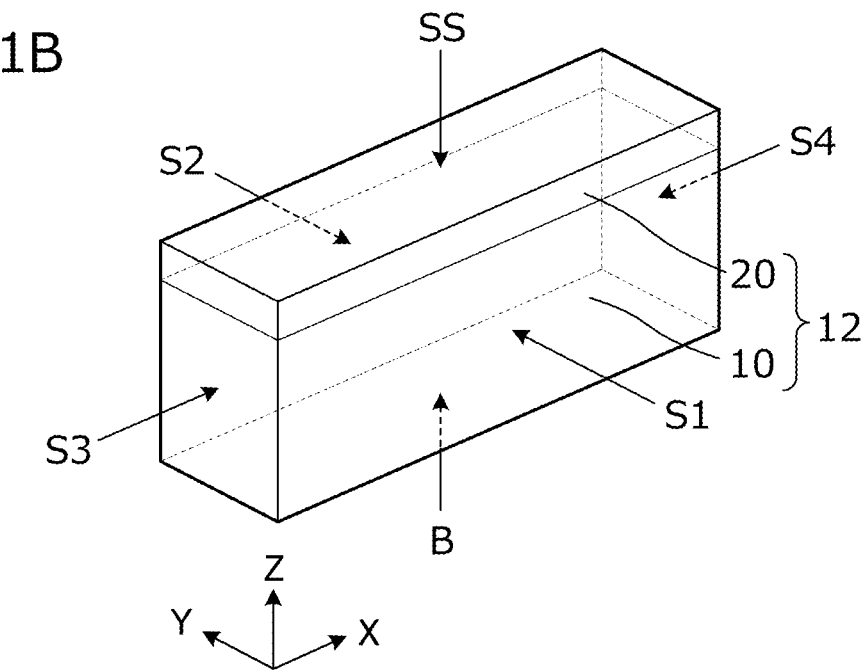
FIG. 1B is a perspective view illustrating each surface of an element body 12 provided in the RFID tag body 30.

FIG. 1A is a perspective view of an RFID tag body 30 according to a first exemplary embodiment. FIG. 1B is a perspective view illustrating each surface of an element body 12 provided in the RFID tag body 30.

The RFID tag body 30 of the present embodiment includes a substrate 10 in which a conductor 1 in a rectangular and coil-like shape is formed. The substrate 10 is, for example, a substrate of a flame retardant type 4 (i.e., FR 4). A capacitor 2 and an RFIC 3 are mounted in an upper portion of the substrate 10, and the capacitor 2 and the RFIC 3 are covered with an insulating coating 20 in the exemplary aspect. The substrate 10 and the insulating coating 20 form an element body 12.

The conductor 1 in a coil-like shape is connected in parallel to the capacitor 2 to form an LC resonance circuit, and the LC resonance circuit is connected to the RFIC.

As illustrated in FIG. 1B, the element body 12 is an insulating resin in a rectangular parallelepiped shape having a first side surface S1 and a second side surface S2 facing each other, a third side surface S3 and a fourth side surface S4 facing each other orthogonal to the first side surface S1, a top surface SS, and a bottom surface B serving as a mounting surface.

A plane of an opening (i.e., the coil opening) of the conductor 1 in a coil-like shape is parallel to the first side surface S1 and the second side surface S2.

Figure 2:
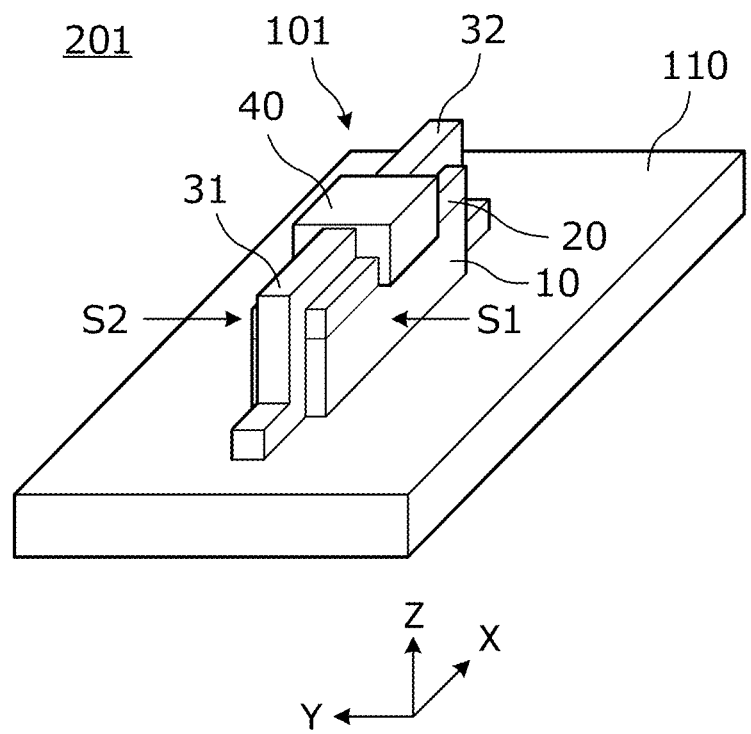
FIG. 2 is a perspective view of an RFID tag-equipped article 201 according to the first exemplary embodiment.
Figure 3:
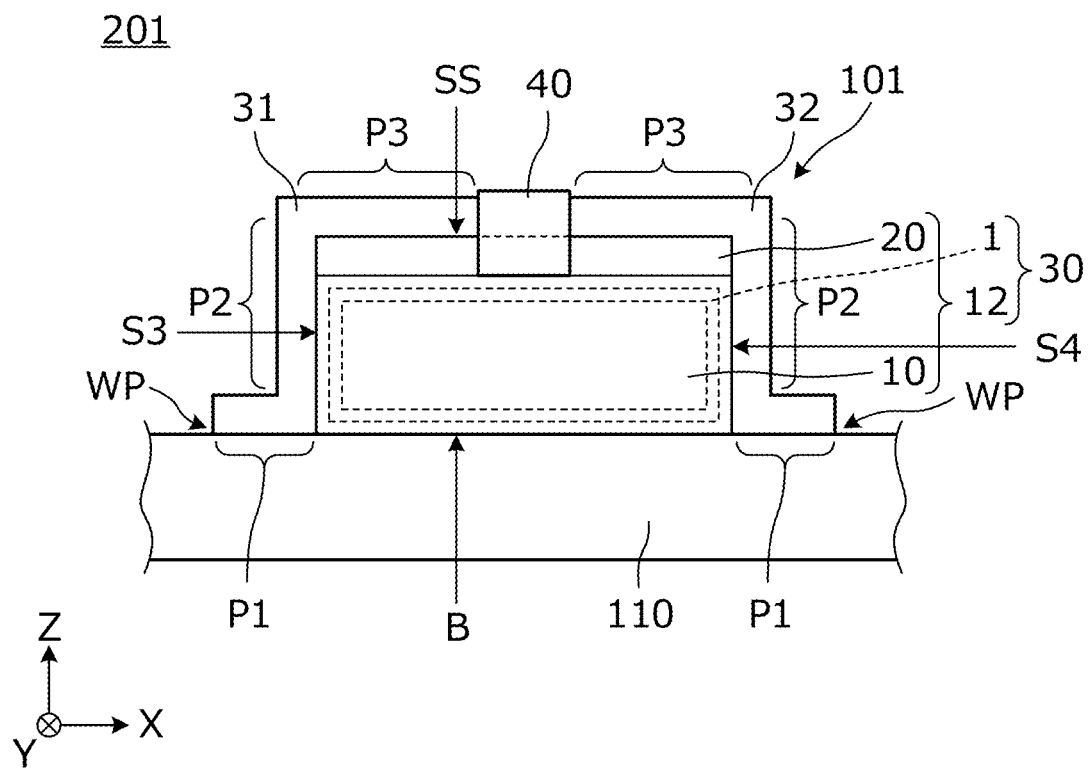
FIG. 3 is a front view of the RFID tag-equipped article 201.

FIG. 2 is a perspective view of an RFID tag-equipped article 201 according to the first embodiment. FIG. 3 is a front view of the RFID tag-equipped article 201.

The RFID tag-equipped article 201 includes an RFID tag 101 and an article 110 to which the RFID tag 101 is attached. The RFID tag 101 includes a first metal fixture 31 and a second metal fixture 32 for fixing the RFID tag body 30 on a metal surface that is a surface of the article 110.

The first metal fixture 31 includes a first portion P1 protruding along an extension surface of the bottom surface B of the element body 12, a second portion P2 disposed along the third side surface S3 thereof, and a third portion P3 disposed along the top surface SS thereof. Similarly, the second metal fixture 32 includes a first portion P1 protruding along an extension surface of the bottom surface B of the element body 12, a second portion P2 disposed along the fourth side surface S4 thereof, and a third portion P3 disposed along the top surface SS thereof. The first metal fixture 31 and the second metal fixture 32 are each, for example, a member formed by punching a copper sheet metal, having a thickness within a range of from about 0.05 mm to 0.5 mm, for example, a thickness of 0.1 mm.

In the exemplary aspect, the article 110 has a metal surface. FIGS. 2 and 3 each show a metal portion of the article 110. The first portion P1 of the first metal fixture 31 and the first portion P1 of the second metal fixture 32 are attached to a surface of the article 110. This example shows the first portion P1 of the first metal fixture 31 and the first portion P1 of the second metal fixture 32 that are welded to the article 110. That is, as illustrated in FIG. 3, a weld WP is formed between the first portion P1 of the first metal fixture 31 and the article 110, and between the first portion P1 of the second metal fixture 32 and the article 110. This welding is performed by, for example, a resistance spot welding method or a laser spot welding method. Such a welding method enables the RFID tag 101 to be firmly fixed to the article 110 and is also advantageous in that dust such as metal scraps is less likely to come out from a joint portion.

Besides the above welding methods, the first portion P1 and the article 110 may be fixed by a screwing method. For example, the RFID tag 101 may be screwed to the article 110 by providing a through-hole in the first portion P1 and a screw hole in the article to allow a screw to pass through the through-hole in the first portion P1. Although the screwing method may not fix as firmly as the welding methods and metal scraps may be generated when screwing, there is an advantage in that the RFID tag 101 can be repaired relatively easily. The screwing method is also effective for an article or an RFID tag that is weak to a heat load and can be damaged by welding because a heat load at the time of welding is not applied to the article 110 or the RFID tag 101. To fix them more firmly, a screwed portion may be welded.

The RFID tag 101 of the present embodiment includes an insulative intermediate connector 40 that connects the first metal fixture 31 and the second metal fixture 32. In an exemplary aspect, the intermediate connector 40 is an insulating resin and is integrally formed with the first metal fixture 31 and the second metal fixture 32. As shown in FIG. 2, the intermediate connector 40 includes portions disposed along the first side surface S1 and the second side surface S2. The intermediate connector 40 may be provided separately from the first metal fixture 31 and the second metal fixture 32. The intermediate connector 40 may be also held between the first metal fixture 31 and the second metal fixture 32 using elasticity of the first metal fixture 31 and the second metal fixture 32.

The structure described above forms the RFID tag-equipped article 201 in which the RFID tag body 30 is fixed to the article 110 using the first metal fixture 31, the second metal fixture 32, and the intermediate connector 40. That is, displacement of the RFID tag body 30 in a direction parallel to an X-axis is restricted by the first metal fixture 31 and the second metal fixture 32, and displacement thereof in a direction parallel to a Y-axis is restricted by the intermediate connector 40.

Figure 15:
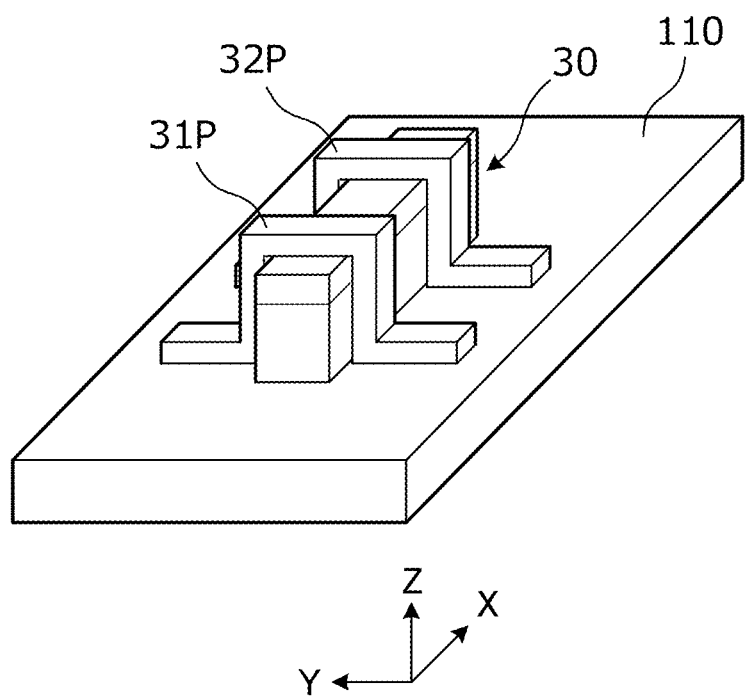
FIG. 15 is a perspective view of an RFID tag-equipped article as a comparative example.

Here, FIG. 15 shows a perspective view of an RFID tag-equipped article as a comparative example. As shown, the RFID tag-equipped article as a comparative example is configured such that metal fixtures 31P and 32P straddling the RFID tag body 30 are attached to a surface of the article 110. The metal fixtures 31P and 32P overlap a conductor in the RFID tag body when the conductor is viewed in a direction perpendicular to a plane of a coil opening of the conductor (when viewed in the direction parallel to the Y-axis). Thus, the metal fixtures partially block the coil opening, and cause deterioration of characteristics of the RFID tag.

In contrast, as illustrated in FIG. 3, the present embodiment is configured such that the first metal fixture 31 and the second metal fixture 32 do not overlap the conductor 1 when the conductor 1 is viewed in a direction perpendicular to the plane of the coil opening (i.e., when viewed in the direction parallel to the Y-axis). Thus, the metal fixtures 31 and 32 do not block (or overlap) the coil opening, and do not cause deterioration of characteristics of the RFID tag. The conductor 1 in a coil-like shape provided in the RFID tag is electromagnetically coupled to the metal surface of the article 110, so that the metal surface effectively acts as a radiator of the RFID tag.

Figure 4:
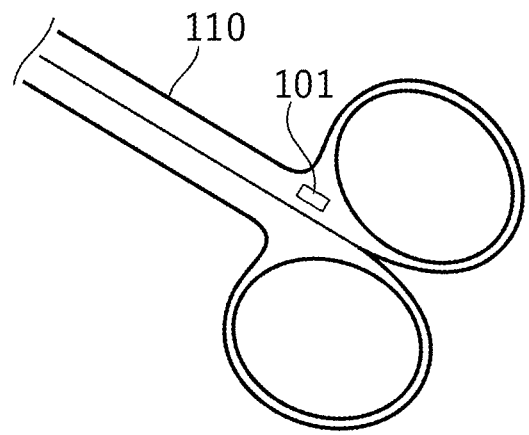
FIG. 4 is a partial plan view illustrating a specific application example of the RFID tag-equipped article 201.

FIG. 4 is a partial plan view illustrating a specific application example of the RFID tag-equipped article 201. The RFID tag-equipped article 201 includes the RFID tag 101 attached to the article 110 that is a small steel article such as a hemostat or medical scissors, for example.

As illustrated in FIG. 4, when the article 110 with the RFID tag 101 attached is a medical instrument, it may be exposed to a high temperature environment for sterilization. When the RFID tag 101 is attached to the article 110 with an adhesive, outgas may be generated from the adhesive. When the RFID tag 101 is attached to the article 110 with a rubber tube, the inside of the rubber tube cannot be sterilized, and thus sterilization cannot be sufficiently performed.

In contrast, the present embodiment enables the RFID tag 101 to be attached to the article 110 by welding without using an adhesive or a rubber tube. After the RFID tag 101 is attached to the article 110, a resin coating may be formed on a surface of the RFID tag 101 by resin potting.

Second Exemplary Embodiment

A second embodiment shows an RFID tag including an RFID tag body that is to be held by a metal fixture, and an RFID tag-equipped article.

Figure 5:
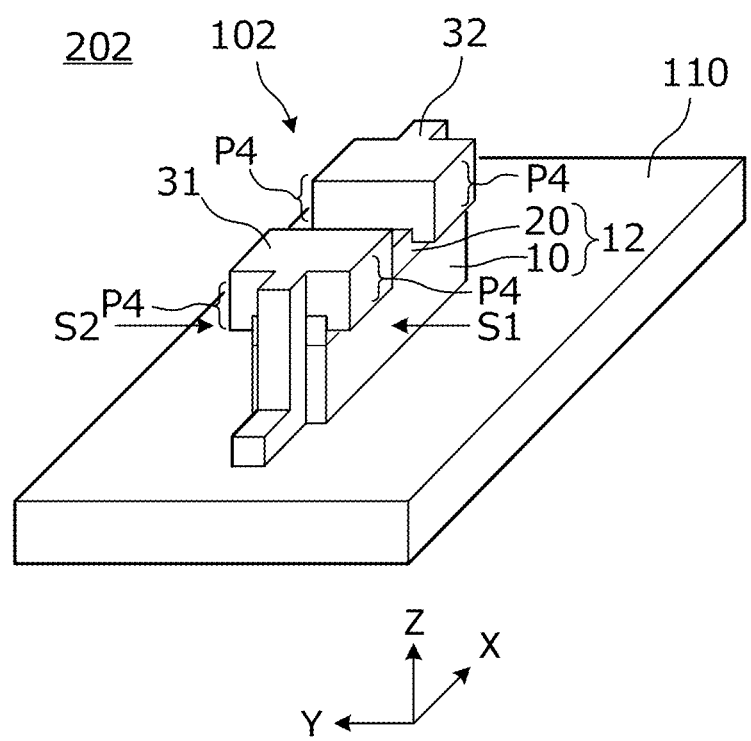
FIG. 5 is a perspective view of an RFID tag-equipped article 202 according to a second exemplary embodiment.
Figure 6:
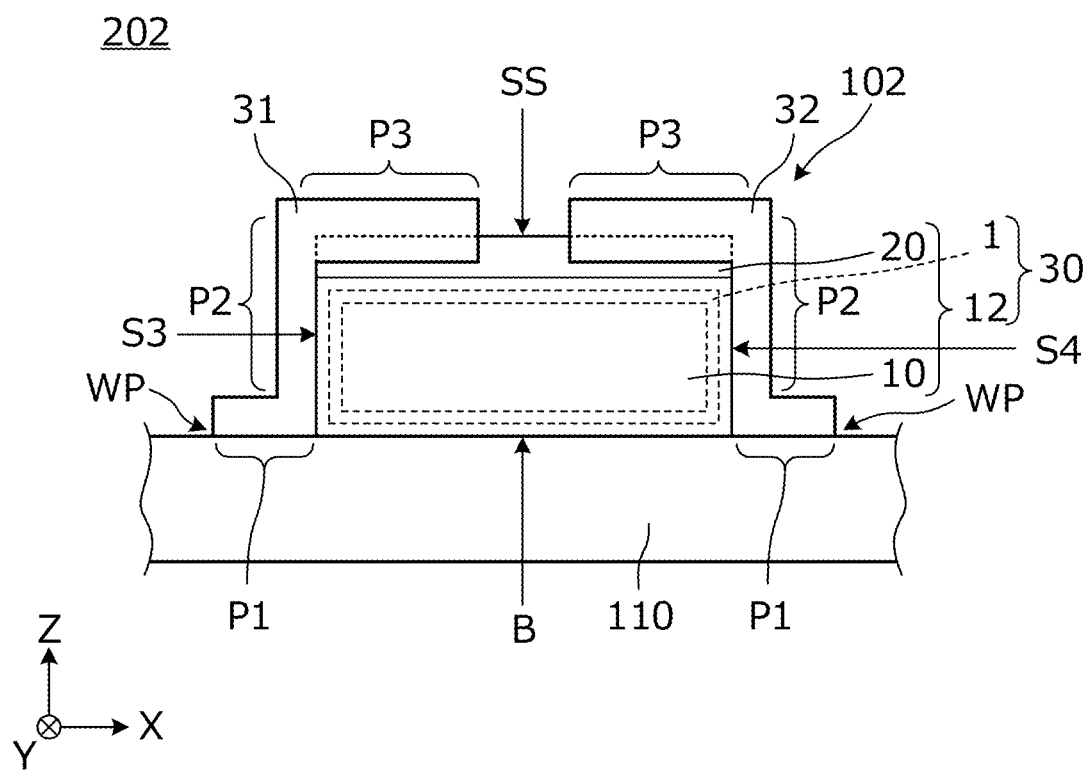
FIG. 6 is a front view of the RFID tag-equipped article 202.

FIG. 5 is a perspective view of an RFID tag-equipped article 202 according to the second embodiment. FIG. 6 is a front view of the RFID tag-equipped article 202.

The RFID tag-equipped article 202 includes an RFID tag 102 and an article 110 to which the RFID tag 102 is attached. The RFID tag 102 includes a first metal fixture 31 and a second metal fixture 32 for fixing an RFID tag body 30 on a metal surface that is a surface of the article 110.

The first metal fixture 31 includes a first portion P1 protruding along an extension surface of the bottom surface B of the element body 12, a second portion P2 disposed along the third side surface S3 thereof, and a third portion P3 disposed along the top surface SS thereof. Similarly, the second metal fixture 32 includes a first portion P1 protruding along an extension surface of the bottom surface B of the element body 12, a second portion P2 disposed along the fourth side surface S4 thereof, and a third portion P3 disposed along the top surface SS thereof.

As illustrated in FIG. 5, the first metal fixture 31 has fourth portions P4 disposed along a part of the first side surface S1 and a part of the second side surface S2. Similarly, the second metal fixture 32 has fourth portions P4 disposed along a part of the first side surface S1 and a part of the second side surface S2.

In this way, the RFID tag body 30 is held by the fourth portions P4 of the metal fixtures 31 and 32, so that displacement of the RFID tag body 30 in a direction parallel to the X-axis and in a direction parallel to the Y-axis is restricted by the first metal fixture 31 and the second metal fixture 32. The metal fixtures 31 and 32, and the RFID tag body 30 may be bonded to each other with an adhesive at contact positions.

Figure 7:
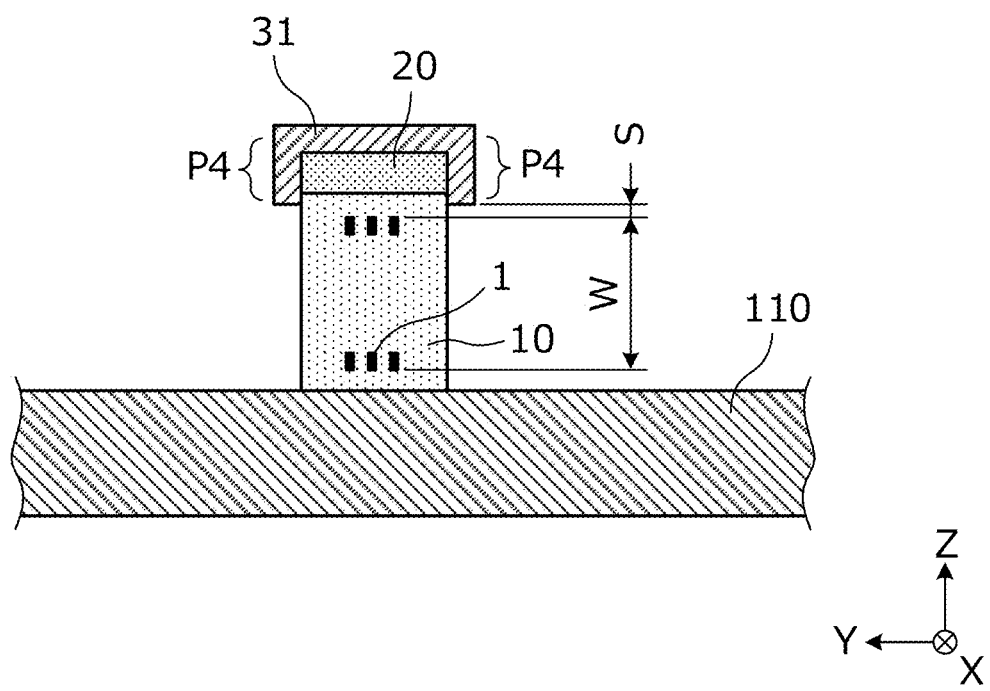
FIG. 7 is a longitudinal sectional view of the RFID tag-equipped article 202 taken along a plane passing through a metal fixture 31.

FIG. 7 is a longitudinal sectional view of the RFID tag-equipped article 202 taken along a plane passing through the metal fixture 31. FIG. 7 illustrates a forming range of a conductor 1 that is designated as W, and a distance between a lower end of each of the fourth portions P4 and the conductor 1 that is designated as S. In this way, the fourth portions P4 of the metal fixture 31 do not overlap the conductor 1 when the conductor 1 is viewed in a direction perpendicular to a plane of a coil opening of the conductor 1 (i.e., when viewed in a direction parallel to the Y-axis). Thus, the metal fixtures 31 and 32 do not block (or otherwise overlap) the coil opening of the conductor 1, and do not cause deterioration of characteristics of the RFID tag.

Third Exemplary Embodiment

A third embodiment shows an RFID tag and an RFID tag-equipped article that are different in shape of a metal fixture and in a positional relationship between a conductor and the metal fixture from each embodiment described above.

Figure 8:
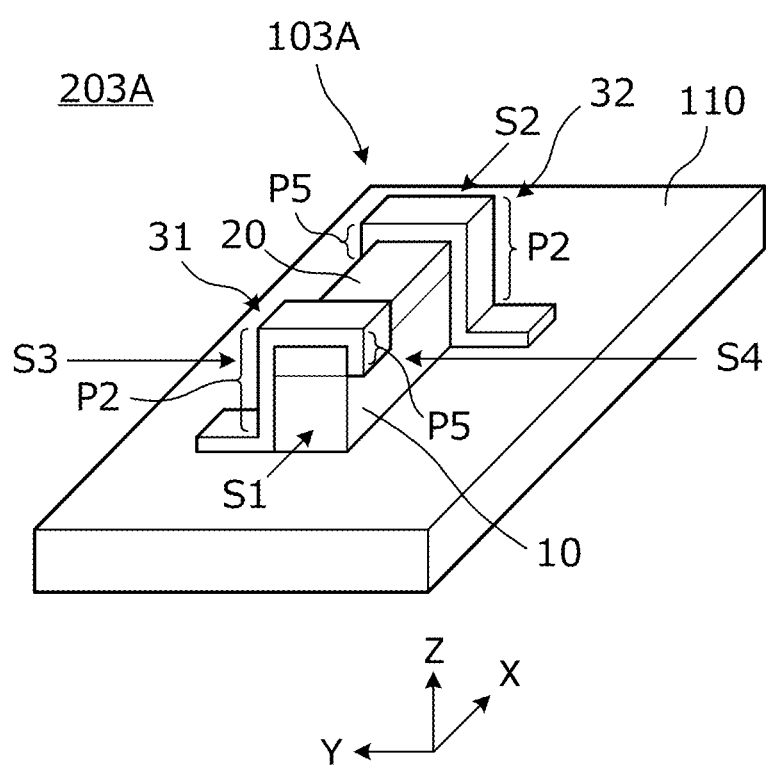
FIG. 8 is a perspective view of an RFID tag-equipped article 203A according to a third exemplary embodiment.
Figure 9:
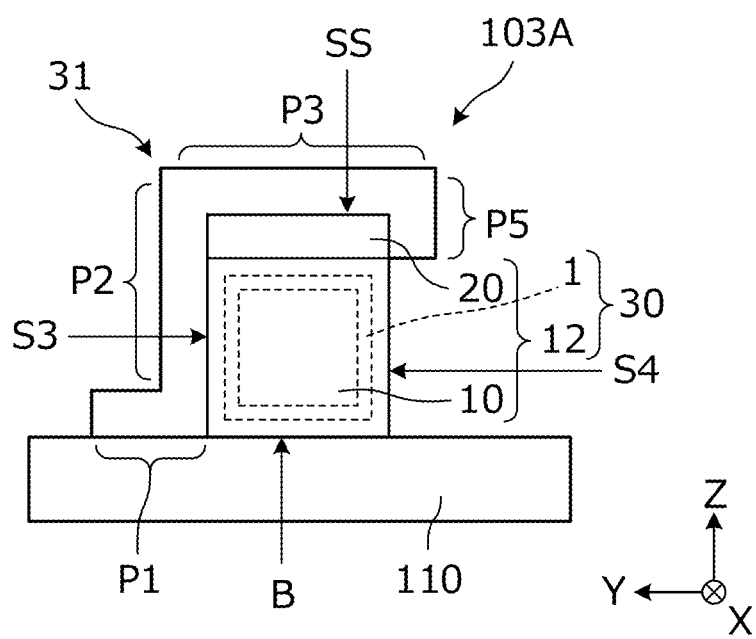
FIG. 9 is a front view of the RFID tag-equipped article 203A.

FIG. 8 is a perspective view of an RFID tag-equipped article 203A according to the third embodiment. FIG. 9 is a front view of the RFID tag-equipped article 203A.

The RFID tag-equipped article 203A includes an RFID tag 103A and an article 110 to which the RFID tag 103A is attached. The RFID tag 103A includes a first metal fixture 31 and a second metal fixture 32 for fixing an RFID tag body 30 on a metal surface that is a surface of the article 110. The RFID tag body 30 of the present embodiment includes a conductor 1 having a coil axis that is in a longitudinal direction of a substrate 10 (i.e., a direction parallel to the X-axis).

The first metal fixture 31 includes a first portion P1 protruding along an extension surface of a bottom surface B of an element body 12, a second portion P2 disposed along a third side surface S3 thereof, a third portion P3 disposed along a top surface SS thereof, and a fifth portion P5 disposed along a fourth side surface S4 thereof. The fifth portion P5 faces the second portion P2 with the insulating coating 20 interposed therebetween. The second metal fixture 32 has the same structure as the first metal fixture 31. However, the second portion P2 is along the fourth side surface S4, and the fifth portion P5 is along the third side surface.

Displacement of the RFID tag body 30 in a direction parallel to the Y-axis is restricted by second portions P2 and fifth portions P5 of the first metal fixture 31 and the second metal fixture 32.

As illustrated in FIG. 9, the metal fixtures 31 and 32 do not overlap the conductor 1 when the conductor 1 is viewed in a direction perpendicular to a plane of a coil opening of the conductor 1 (i.e., when viewed in a direction parallel to the X-axis). Thus, the metal fixtures 31 and 32 do not block (or otherwise overlap) the coil opening of the conductor 1, and do not cause deterioration of characteristics of the RFID tag.

Figure 10:
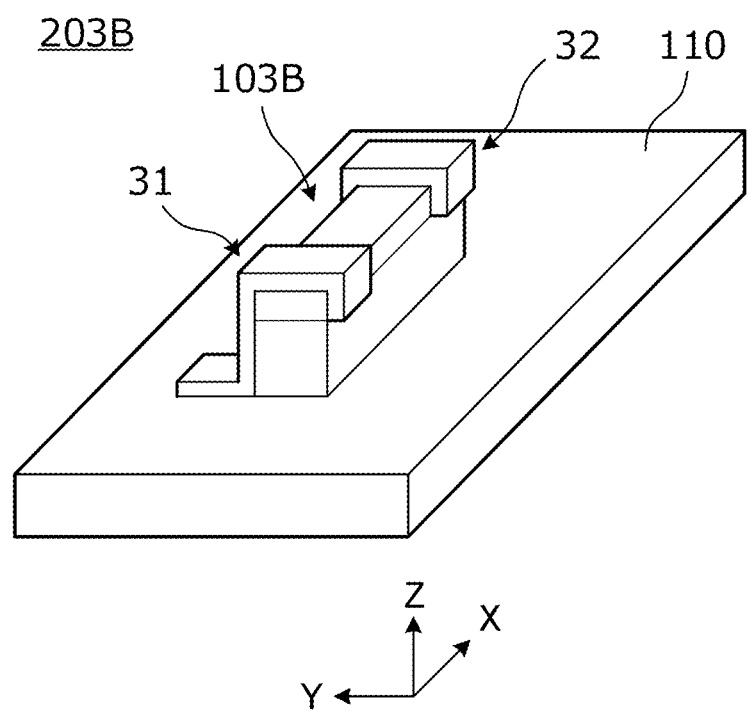
FIG. 10 is a perspective view of another RFID tag-equipped article 203B according to the third exemplary embodiment.

FIG. 10 is a perspective view of another RFID tag-equipped article 203B according to the third embodiment. The RFID tag-equipped article 203B includes an RFID tag 103B and an article 110 to which the RFID tag 103B is attached. The RFID tag 103B includes a first metal fixture 31 and a second metal fixture 32 for fixing an RFID tag body on a metal surface that is a surface of the article 110. The RFID tag-equipped article 203B is different in a mounting direction of the second metal fixture 32 from the example illustrated in FIG. 8. Other configurations are as described above.

The metal fixtures 31 and 32 hold the RFID tag body using second portions P2 and fifth portions P5, so that the two metal fixtures 31 and 32 may be disposed in the same direction as illustrated in FIG. 10.

Fourth Exemplary Embodiment

A fourth embodiment shows an RFID tag different in shape of a metal fixture from each embodiment described above.

Figure 11A:
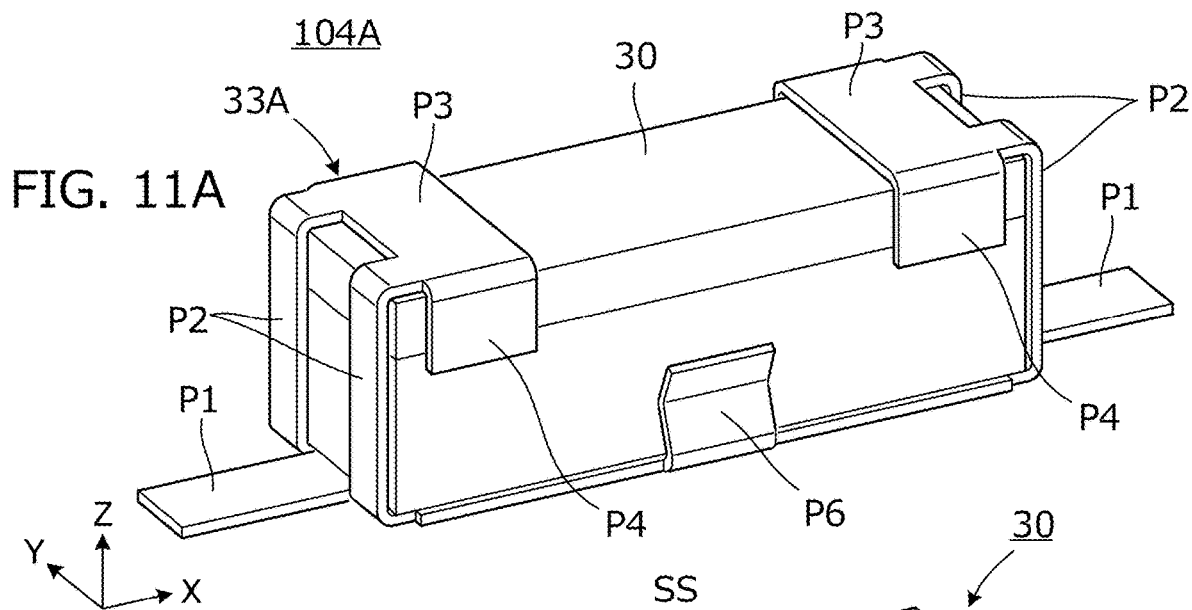
FIG. 11A is a perspective view of an RFID tag 104A according to a fourth exemplary embodiment.
Figure 11B:
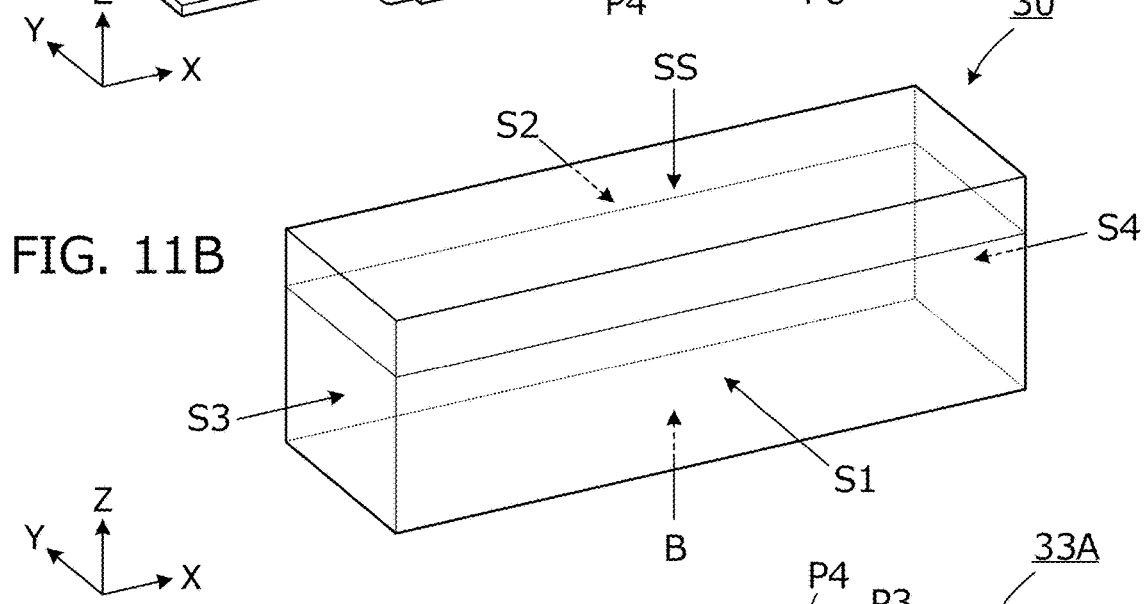
FIG. 11B is a perspective view of an RFID tag body 30 provided in the RFID tag 104A.
Figure 11C:
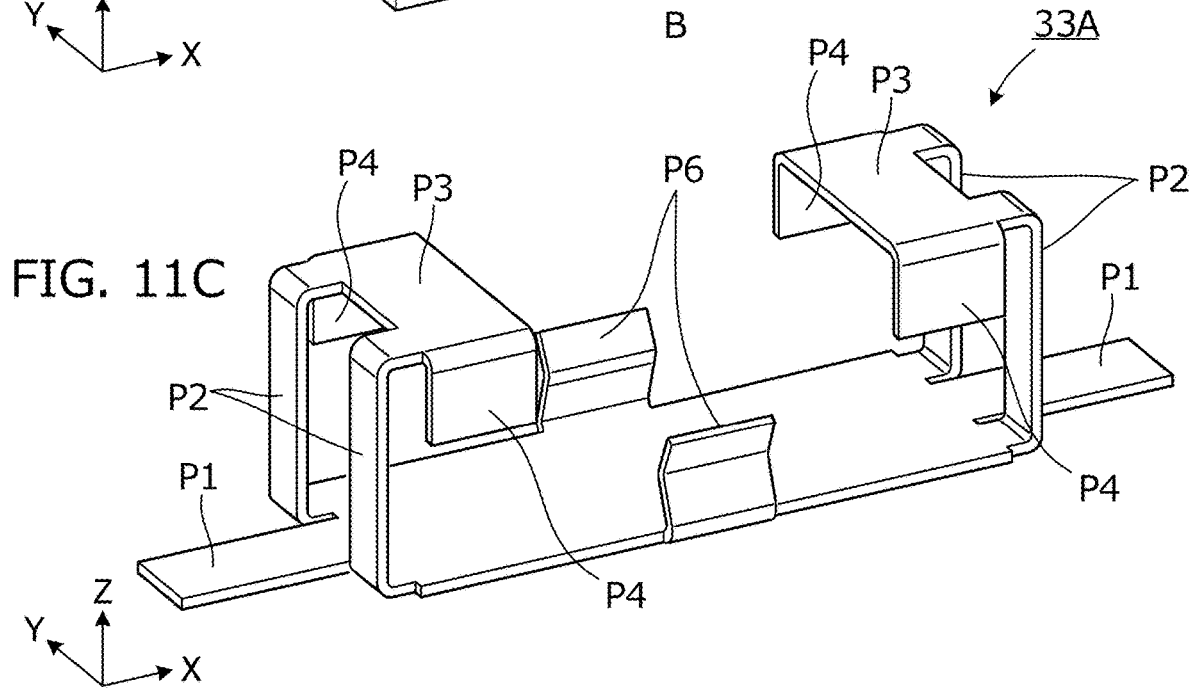
FIG. 11C is a perspective view of a metal fixture 33A provided in the RFID tag 104A.

FIG. 11A is a perspective view of an RFID tag 104A according to the fourth embodiment. FIG. 11B is a perspective view of an RFID tag body 30 provided in the RFID tag 104A. FIG. 11C is a perspective view of a metal fixture 33A provided in the RFID tag 104A.

The RFID tag 104A includes the RFID tag body 30 and the metal fixture 33A. The RFID tag body 30 is configured as shown in the first embodiment.

In an exemplary aspect, the metal fixture 33A is formed of one metal sheet. As shown, the metal fixture 33A includes first portions P1 and P1 each protruding along an extension surface of a bottom surface B of the RFID tag body 30, second portions P2 and P2 disposed along a third side surface S3 thereof, second portions P2 and P2 disposed along a fourth side surface S4 thereof, third portions P3 and P3 disposed along a top surface SS thereof, fourth portions P4 and P4 disposed along a first side surface S1 thereof, and fourth portions P4 and P4 disposed along a second side surface S2 thereof. The metal fixture 33A further includes a sixth portion P6 disposed along the first side surface S1 and a sixth portion P6 disposed along the second side surface S2.

Moreover, the RFID tag body 30 is fixed in an X-axis direction by the second portions P2 of the metal fixture 33A that face each other in the X-axis direction. The RFID tag body 30 is also fixed in a Y-axis direction by the fourth portions P4 of the metal fixture 33A that face each other in the Y-axis direction. The RFID tag body 30 is further fixed in the Y-axis direction by the sixth portions P6 of the metal fixture 33A that face each other in the Y-axis direction.

The two sixth portions P6 have elasticity in a direction in which the first side surface S1 and the second side surface S2 of the RFID tag body 30 are interposed between the two sixth portions P6, and elastically hold the RFID tag body 30. This increases positional accuracy of the RFID tag body 30 with respect to the metal fixture 33A to reduce variations in characteristics of the RFID tag 104A.

The present embodiment is preferably configured such that the sixth portions P6 do not overlap a conductor in a loop-like shape or a coil-like shape formed in the RFID tag body 30 when viewed in a direction perpendicular to a plane of an opening of the conductor. Alternatively, the amount of overlap is preferably small. This enables reducing influence of the sixth portions P6 on magnetic flux linking through the coil opening.

Figure 12A:
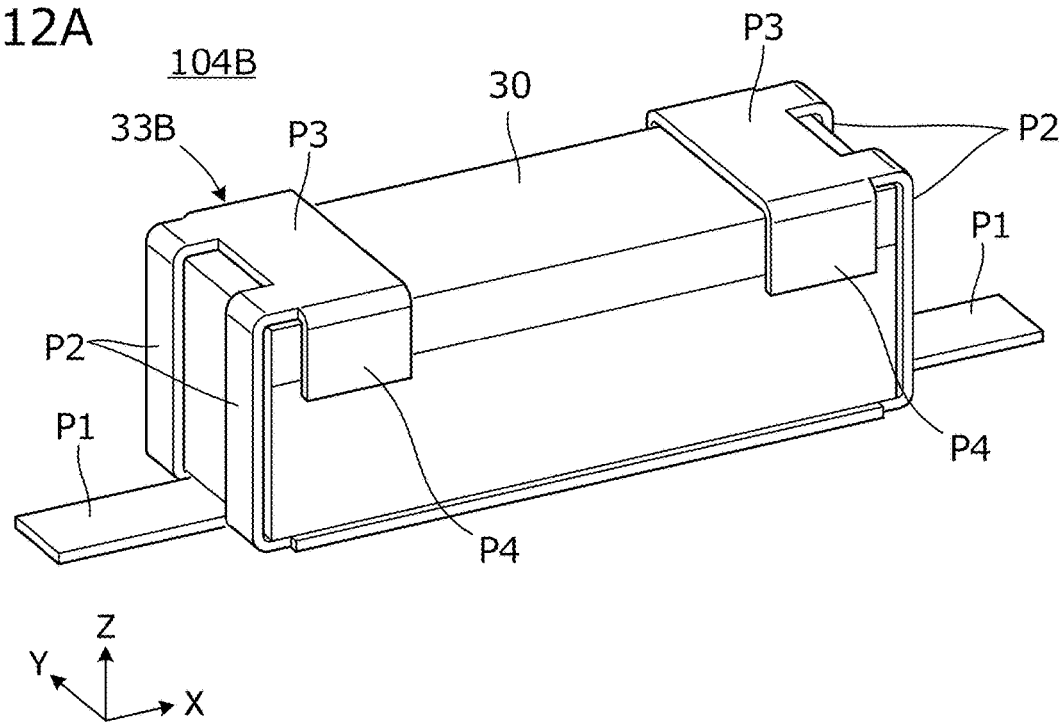
FIG. 12A is a perspective view of another RFID tag 104B of the present embodiment.
Figure 12B:
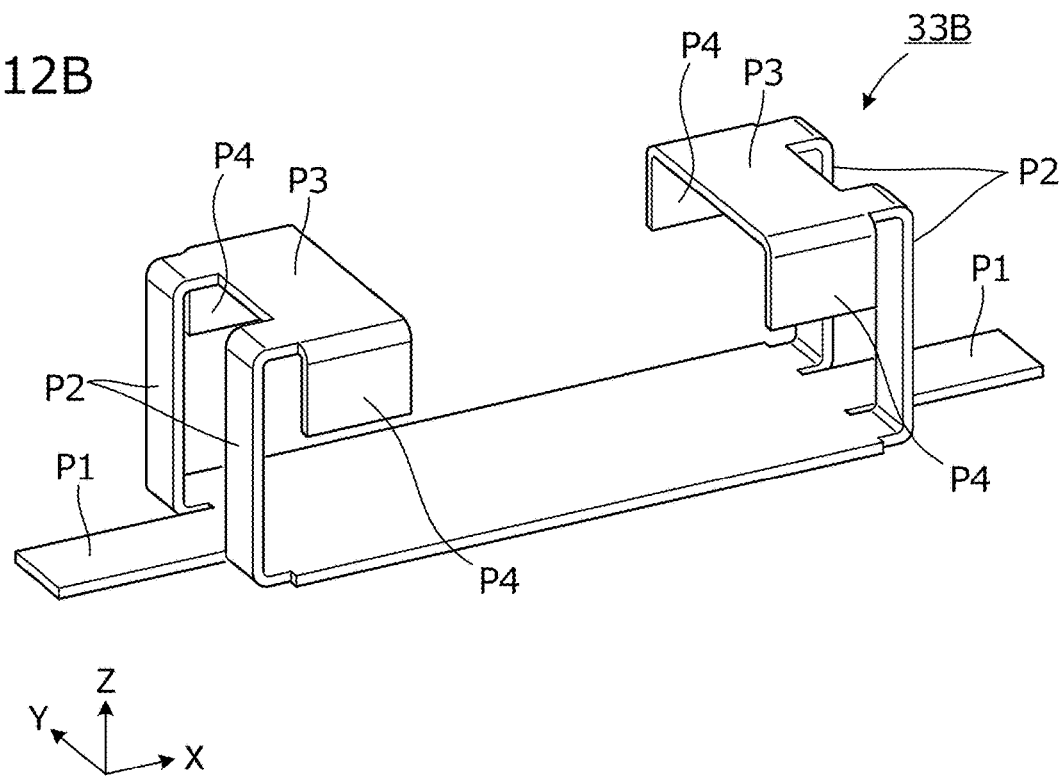
FIG. 12B is a perspective view of a metal fixture 33B provided in the RFID tag 104B.

FIG. 12A is a perspective view of another RFID tag 104B of the present embodiment. FIG. 12B is a perspective view of a metal fixture 33B provided in the RFID tag 104B. Unlike the example illustrated in FIGS. 11A and 11C, there is no sixth portion P6. Even when there is no sixth portion P6 as described above, displacement of the RFID tag body 30 in the Y-axis direction is restricted by the fourth portions P4 of the metal fixture 33B that face each other in the Y-axis direction.

Figure 13A:
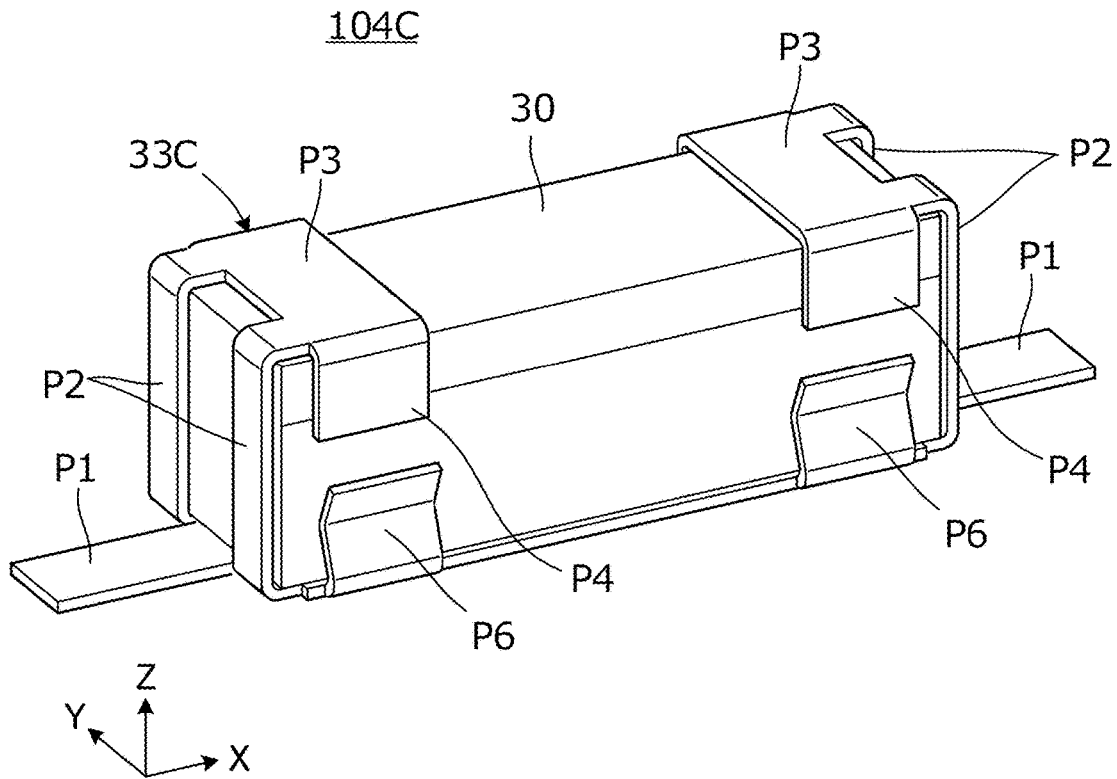
FIG. 13A is a perspective view of still another RFID tag 104C of the present embodiment.
Figure 13B:
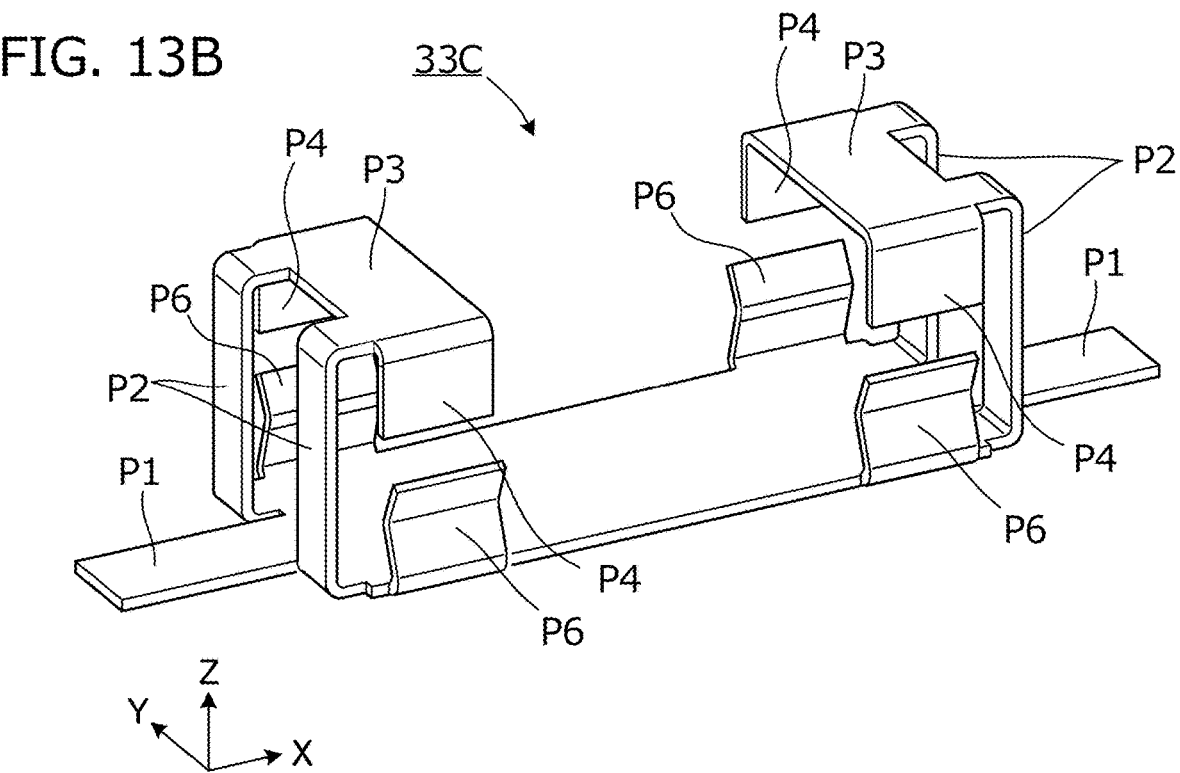
FIG. 13B is a perspective view of a metal fixture 33C provided in the RFID tag 104C.

FIG. 13A is a perspective view of still another RFID tag 104C of the present embodiment. FIG. 13B is a perspective view of a metal fixture 33C provided in the RFID tag 104C. Unlike the example shown in FIGS. 11A and 11C, sixth portions P6 are provided at four respective places. The sixth portions P6 include two pairs of sixth portions P6, facing each other in the Y-axis direction. In this way, the RFID tag 104C may be configured such that the pairs of sixth portions P6 hold portions near corresponding corners of the RFID tag body 30, in the Y-axis direction.

Fifth Exemplary Embodiment

A fifth embodiment shows an RFID tag different in shape of a metal fixture from each embodiment described above.

Figure 14A:
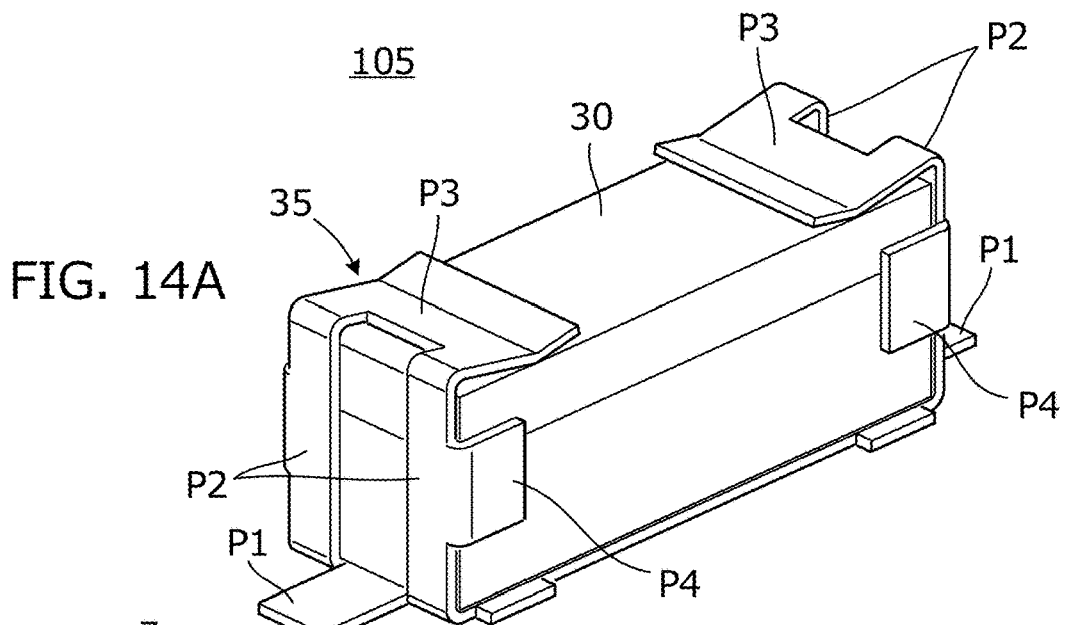
FIG. 14A is a perspective view of an RFID tag 105 according to a fifth exemplary embodiment.
Figure 14B:
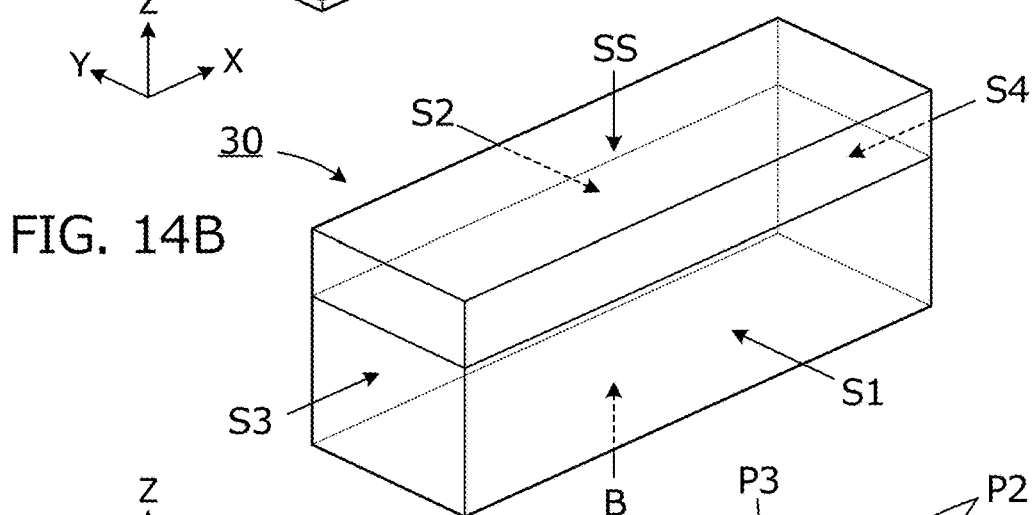
FIG. 14B is a perspective view of an RFID tag body 30 provided in the RFID tag 105.
Figure 14C:
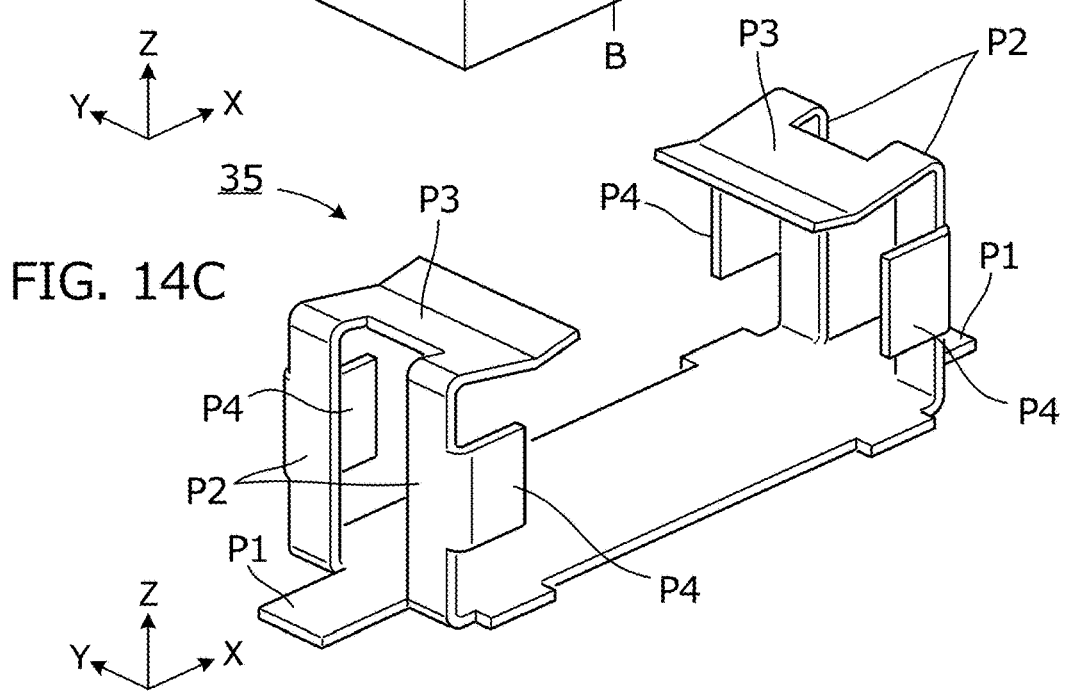
FIG. 14C is a perspective view of a metal fixture 35 provided in the RFID tag 105.

FIG. 14A is a perspective view of an RFID tag 105 according to the fifth embodiment. FIG. 14B is a perspective view of an RFID tag body 30 provided in the RFID tag 105. FIG. 14C is a perspective view of a metal fixture 35 provided in the RFID tag 105.

The RFID tag 105 includes the RFID tag body 30 and the metal fixture 35. The RFID tag body 30 is configured as shown in the first embodiment.

The metal fixture 35 is formed of one metal sheet. The metal fixture 35 includes first portions P1 and P1 each protruding along an extension surface of a bottom surface B of the RFID tag body 30, second portions P2 and P2 disposed along a third side surface S3 thereof, second portions P2 and P2 disposed along a fourth side surface S4 thereof, third portions P3 and P3 disposed along a top surface SS thereof, fourth portions P4 and P4 disposed along a first side surface S1 thereof, and fourth portions P4 and P4 disposed along a second side surface S2 thereof.

The RFID tag body 30 is fixed in an X-axis direction by the second portions P2 of the metal fixture 35 that face each other in the X-axis direction. The RFID tag body 30 is also fixed in a Y-axis direction by the fourth portions P4 of the metal fixture 35 that face each other in the Y-axis direction. Unlike the example shown in the fourth embodiment, the third portions P3 each have elasticity to hold the RFID tag body 30 in a −Z direction. Thus, the RFID tag body 30 is brought into close contact with a lower portion of the metal fixture 35. This increases positional accuracy of the RFID tag body 30 with respect to the metal fixture 35 to reduce variations in characteristics of the RFID tag 105. That is, a reading distance of the RFID tag 105 is improved, and a readable distance thereof is stabilized.

Finally, it is noted that the above description of the exemplary embodiments is illustrative in all respects and not restrictive. Thus, those skilled in the art can appropriately make modifications and alterations and that the scope of the present invention also includes alterations from the embodiments within the scope equivalent to those embodiment described above.

For example, although the example described in each of the above embodiments shows the example in which the article 110 in a metal plate-like shape is provided, an article having a portion with at least a metal surface may be provided, and a first metal fixture 31 and a second metal fixture 32 of an RFID tag may be attached to the metal portion.

Although each of the above exemplary embodiments show that the first portion P1 of each of the first metal fixture 31 and the second metal fixture 32 of the RFID tag 101 is welded to the article 110, the first portion P1 may be screwed to the article 110.

Moreover, although each of the above embodiments show that the RFID tag and the RFID tag-equipped article, provided with two metal fixtures 31 and 32, a single metal fixture may be provided. This case may preferably allow the RFID tag body 30 to be elastically pressed against the article 110 using elasticity of the metal fixtures.

Yet further, although each of the embodiments described above show the example in which the conductor 1 in a coil-like shape having a plurality of turns is formed in an insulating resin element body, the number of turns may be one or less than one, and thus a conductor in a loop-like shape may be formed.

REFERENCE SIGNS LIST

B bottom surface
P1 first portion
P2 second portion
P3 third portion
P4 fourth portion
P5 fifth portion
P6 sixth portion
S1 first side surface
S2 second side surface
S3 third side surface
S4 fourth side surface
SS top surface
WP weld
1 conductor
2 capacitor
3 RFIC
10 substrate
12 element body
20 insulating coating
30 RFID tag body
31 first metal fixture
32 second metal fixture
33A, 33B, 33C metal fixture
31P, 32P metal fixture
35 metal fixture
40 intermediate connector
101, 102, 103A, 103B, 104A, 104B, 104C, 105 RFID tag
110 article
201, 202, 203A, 203B RFID tag-equipped article

The invention claimed is:
1. An RFID tag comprising:
an RFID tag body having a loop-shape or coil-shape conductor; and
a metal fixture configured to fix the RFID tag body to a metal surface of an article,
wherein the conductor is disposed in an element body having a rectangular parallelepiped shape that has first and second side surfaces that face each other, third and fourth side surfaces that face each other and are orthogonal to the first side surface, a top surface, and a bottom surface configured as a mounting surface,
wherein the conductor comprises an opening having a plane that is parallel to the first and second side surfaces,
wherein the metal fixture includes a first portion that protrudes along an extension surface of the bottom surface of the element body, a second portion that is disposed along the third side surface or the fourth side surface of the element body, and a third portion disposed along the top surface of the element body, and
wherein the third portion is divided on the top surface into two portions disposed to not be in contact with each other.
2. The RFID tag according to claim 1, wherein the metal fixture includes a fourth portion disposed along a part of the first side surface and a part of the second side surface, such that the fourth portion does not overlap the conductor when the conductor is viewed in a direction perpendicular to the plane of the opening.
3. The RFID tag according to claim 2, wherein the fourth portion does not block or overlap the opening of the conductor when the conductor is viewed in the direction perpendicular to the plane of the opening.
4. The RFID tag according to claim 1, wherein the metal fixture includes a fifth portion that is disposed along a part of the third side surface or the fourth side surface from the top surface, and that faces the second portion.
5. The RFID tag according to claim 1, wherein the metal fixture includes a first metal fixture having the second portion disposed along the third side surface, and a second metal fixture having the second portion disposed along the fourth side surface.
6. The RFID tag according to claim 5, wherein the first metal fixture and the second metal fixture are separated on the top surface.
7. The RFID tag according to claim 6, further comprising:
an insulative intermediate connector that is disposed between and connects the first metal fixture and the second metal fixture,
wherein the insulative intermediate connector is disposed along the first side surface and the second side surface.
8. The RFID tag according to claim 1, wherein the third portion has elasticity configured to press the top surface of the element body toward the bottom surface.
9. The RFID tag according to claim 1, wherein the metal fixture includes at least one pair of sixth portions disposed respectively on the first and second side surfaces of the element body and facing each other to secure the element body therebetween.
10. The RFID tag according to claim 1, wherein the conductor comprise a coil that includes a plurality of turns that extend in directions parallel to the respective sides of the rectangular parallelepiped shape of the element body.
11. The RFID tag according to claim 10, further comprising a capacitor and an RFIC disposed in the element body.
12. The RFID tag according to claim 11, wherein the conductor is connected in parallel to the capacitor to form an LC resonance circuit that is connected to the RFIC.
13. An RFID tag comprising:
an RFID tag body having a conductor with a coil opening; and
a metal fixture configured to fix the RFID tag body to a metal surface of an article,
wherein the RFID tag body is rectangular parallelepiped shape with first and second side surfaces that face each other, third and fourth side surfaces that face each other and are orthogonal to the first side surface, a top surface, and a bottom surface,
wherein the conductor is disposed in the RFID tag body and the coil opening extends in a plane that is parallel to the first and second side surfaces of the RFID tag body, and
wherein the metal fixture includes a mounting portion that extends parallel to and from the bottom surface of the RFID tag body and a plurality of securing portions that secure the RFID tag body, such that the plurality of securing portions do not block or overlap the coil opening of the conductor when the conductor is viewed in the direction perpendicular to the plane,
wherein the mounting portion is a first portion of the metal fixture and the plurality of securing portions include a second portion that is disposed along the third side surface or the fourth side surface of the RFID tag body, and a third portion divided on the top surface of the RFID tag body into two portions that are not in contact with each other.

14. The RFID tag according to claim 13, wherein the metal fixture includes a first metal fixture having the second portion disposed along the third side surface, and a second metal fixture having the second portion disposed along the fourth side surface.

15. The RFID tag according to claim 14, wherein the first metal fixture and the second metal fixture are separated on the top surface.

16. The RFID tag according to claim 15, further comprising:
an insulative intermediate connector that is disposed between and connects the first metal fixture and the second metal fixture,
wherein the insulative intermediate connector is disposed along the first side surface and the second side surface.

17. An RFID tag-equipped article comprising:
an article having a metal surface; and
an RFID tag coupled to the metal surface and including:
an RFID tag body having a loop-shape or coil-shape conductor; and
a metal fixture configured to fix the RFID tag to the metal surface of the article,
wherein the conductor is disposed in an element body having a rectangular parallelepiped shape that has first and second side surfaces that face each other, third and fourth side surfaces that face each other and are orthogonal to the first side surface, a top surface, and a bottom surface configured as a mounting surface, wherein the conductor comprises an opening having a plane that is parallel to the first and second side surfaces,
wherein the metal fixture includes a first portion that protrudes along an extension surface of the bottom surface of the element body, a second portion that is disposed along the third side surface or the fourth side surface of the element body, and a third portion disposed along the top surface of the element body,
wherein the third portion is divided on the top surface into two portions disposed to not be in contact with each other, and
wherein the first portion of the metal fixture is attached to the metal surface of the article.

18. The RFID tag-equipped article according to claim 17, wherein the first portion of the metal fixture is welded to the metal surface.

19. The RFID tag-equipped article according to claim 17, wherein the first portion of the metal fixture is secured to the metal surface by at least one screw.

* * * * *